United States Patent [19]
Taylor et al.

[11] Patent Number: 5,212,229
[45] Date of Patent: May 18, 1993

[54] MONODISPERSED ACRYLIC POLYMERS IN SUPERCRITICAL, NEAR SUPERCRITICAL AND SUBCRITICAL FLUIDS

[75] Inventors: James W. Taylor, South Charleston; John N. Argyropoulos, Scott Depot; Jeffrey J. Lear, Dunbar, all of W. Va.

[73] Assignee: Union Carbide Chemicals & Plastics Technology Corporation, Danbury, Conn.

[21] Appl. No.: 676,547

[22] Filed: Mar. 28, 1991

[51] Int. Cl.$^5$ ............................................. C08L 31/00
[52] U.S. Cl. ................................... 524/556; 524/383; 524/379; 524/389; 524/390; 524/424
[58] Field of Search ............... 524/556, 383, 379, 389, 524/390, 424

[56] References Cited

U.S. PATENT DOCUMENTS

| | | | |
|---|---|---|---|
| 4,124,528 | 11/1978 | Modell | 252/411 |
| 4,189,914 | 2/1980 | Marek et al. | 60/726 |
| 4,375,387 | 3/1983 | deFilippi et al. | 202/169 |
| 4,582,731 | 4/1986 | Smith | 427/421 |
| 4,619,735 | 10/1986 | Norton | 162/135 |
| 4,734,227 | 3/1988 | Smith | 264/13 |
| 4,734,451 | 3/1988 | Smith | 524/493 |
| 4,737,384 | 4/1988 | Murthy et al. | 427/369 |
| 4,923,720 | 5/1990 | Lee | 427/422 |

FOREIGN PATENT DOCUMENTS

| | | |
|---|---|---|
| 2603664 | 8/1979 | Fed. Rep. of Germany . |
| 2853066 | 6/1980 | Fed. Rep. of Germany . |
| 55-84328 | 6/1980 | Japan . |
| 58-168674 | 10/1983 | Japan . |
| 59-16703 | 1/1984 | Japan . |
| 62-152505 | 7/1987 | Japan . |
| 868051 | 4/1988 | South Africa . |

OTHER PUBLICATIONS

Francis, A. W., "Ternary Systems of Liquid Carbon Dioxide", J. Phys. Chem. 58:1099, Dec., 1954.
Smith, R. D. et al., "Direct Fluid Injection Interface for Capillary Supercritical Fluid Chromatography-Mass Spectrometry", J. Chromatog. 247(1982): 231-243.
Krukonis, V., "Supercritical Fluid Nucleation of Difficult-to-Comminute Solids", paper presented at 1984 Annual Meeting, AIChE, San Francisco, Calif., Nov. 25-30, 1984.
Dandage, D. K., et al., "Structure Solubility Correlations: Organic Compounds and Dense Carbon Dioxide Binary Systems", Ind. Eng. Chem. Prod. Res. Dev. 24: 162-166 (1985).
Matson, D. W., et al., "Production of Powders and Films by the Rapid Expansion of Supercritical Solutions", J. Materials Science 22: 1919-1928 (1987).
McHugh, M. A. et al., "Supercritical Fluid Extraction, Principles and Practice", Butterworth Publishers (1986) Contents and Appendices.
Cobbs, W. et al., "High Solids Coatings Above 80% By Volume", Water-Borne & High Solids Coatings Symposium, Mar., 1980.
Matson, D. W. et al., "Production of Fine Powders by the Rapid Expansion of Supercritical Fluid Solutions", Advances in Ceramics vol. 21, pp. 109-121 (1987).
Kitamura, Y., et al., "Critical Superheat for Flashing of Superheated Liquid Jets"Ind. Eng.Chem. Fund. 25:206-211 (1986).
Petersen, R. C. et al., "The Formation of Polymer Fibers From the Rapid Expansion of SCF Solutions" Pol. Eng. & Sci. (1987) vol. 27 pp. 1693-1687.

Primary Examiner—Paul R. Michl
Assistant Examiner—John J. Guarriello
Attorney, Agent, or Firm—M. N. Reinisch

[57] ABSTRACT

A coating composition low in volatile organic solvents comprising a monodispersed acrylic polymer solutions containing supercritical, near supercritical or subcritical fluids as a diluent therein. Desirably, the monodispersed acrylic polymer has a molecular weight such that it is, as such, a polymeric coating vehicle.

18 Claims, 3 Drawing Sheets

Normalized Saturation Point vs. Mn

MONODISPERSED ACRYLIC POLYMERS IN SUPERCRITICAL, NEAR SUPERCRITICAL AND SUBCRITICAL FLUIDS

BRIEF DESCRIPTION OF THE INVENTION

Acrylic polymer solutions containing supercritical, near supercritical or subcritical fluid dilutant in which the acrylic polymer is of the monodispersed-type and possesses desirable coating capabilities by virtue of having a $M_n$ or $M_w$ of at least 2,500. Significantly improved compatibility between high performance monodispersed-type acrylic polymers and the supercritical, near supercritical or subcritical fluids has been found to exist resulting in less need for volatile organic (VOC) solvents to provide acrylic polymer solutions having a suitable viscosity for coating applications and improved sprayed coatings.

BACKGROUND TO THE INVENTION

Environmental concerns have recently stimulated the coating industry to find ways to reduce pollution by volatile organic compounds used as solvents in painting and finishing operations. A great deal of emphasis has been placed on the development of new coating technologies which diminish the emission of organic solvent vapors. A number of technologies have emerged to meet most but not all of the performance and application requirements, and at the same time meet emission requirements and regulations. They are: (a) powder coatings, (b) water-borne dispersions, (c) water-borne solutions, (d) non-aqueous dispersions, and (e) high solids compositions. Each technology has been employed in certain applications and each has found a niche in a particular industry. However, at the present time, none has provided the performance and application properties that was hoped for initially.

Powder application, for example, while providing ultra-low emission of organic vapors, is oftentimes characterized by poor gloss or good gloss with heavy orange peel, poor definition of image gloss, and poor film uniformity. Pigmentation incorporation is often a problem that at times requires milling and extrusion of the polymer-pigment composite mixture followed by cryogenic grinding. In addition, changing colors of the coatings line often requires a complete cleaning because of dust contamination of the application equipment and finishing area.

Water-borne coatings cannot be applied under conditions of high relative humidity without serious coating defects. These defects result from the fact that under conditions of high humidity, water evaporates more slowly than the organic co-solvents of the coalescing aid. As might be expected, in the case of aqueous dispersions, the loss of the organic cosolvent/coalescing aid interferes with film formation resulting in poor gloss, poor uniformity and pin holes. Additionally, water-borne coatings are not as resistant to corrosive environments as are the more conventional solvent-borne coatings.

Coatings applied from organic solvents at high solids avoid many of the pitfalls of powder and water-borne coatings. In these solvent systems, the molecular weight of the polymer is often low and reactive functionality is necessary to crosslink the coating after it has been applied. In reality, there is a limit in the ability of this technology to meet the performance requirements of a commercial coating operation. Present high solids systems are difficult to apply to vertical surfaces without running and sagging of the coating. Often they are prone to cratering and pin-holing. If they have good reactivity they have poor shelf and pot-life; if they have shelf stability then often they cure and/or crosslink slowly or require high temperature and energy to cure.

The use of supercritical fluid as a transport medium for the manufacture of surface coatings is well known. German patent application 28 53 066 describes the use of a gas in the supercritical state as the fluid medium containing the solid or liquid coating substance in the dissolved form. In particular, the application addresses the coating of porous bodies with a protectant or a reactive or nonreactive decorative finish by immersion of the porous body in the supercritical fluid coupled with a pressure drop to effect the coating. The most significant porous bodies are porous catalysts. The applicant characterizes fabrics as porous bodies.

Smith, U.S. Pat. No. 4,582,731, patented Apr. 15, 1986, and U.S. Pat. No. 4,734,451, patented Mar. 29, 1988, describe forming a supercritical solution which includes a supercritical fluid solvent and a dissolved solute of a solid material and spraying the solution to produce a "molecular spray." A "molecular spray" is defined as a spray "of individual molecules (atoms) or very small clusters of the solute." The Smith patents are directed to producing fine films and powders. The films are used as surface coatings.

U.S. patent application Ser. No. 133,068, now abandoned and U.S. Pat. No. 4,923,720, to Lee et al., disclose a process and apparatus for the liquid spray application of coatings to a substrate while minimizing the use of the environmentally undesirable organic diluents. The process of the application involves forming a liquid mixture comprising a coating polymer and a supercritical fluid sufficient to render the viscosity of said mixture suitable for spray application and then spraying the liquid mixture onto a substrate to form a liquid coating. The application and patent describe the addition of at least one organic solvent to the liquid mixture prior to spraying. The preferred supercritical fluid is supercritical carbon dioxide. The process employs an apparatus in which the components of the liquid spray mixture can be blended and sprayed onto an appropriate substrate. The apparatus contains multiple means for supplying at least one polymeric coating compound, for supplying at least one organic solvent and for supplying supercritical carbon dioxide fluid and means for forming a liquid mixture of these components. These means are combined with means for spraying said liquid mixture onto a substrate. The apparatus may contain means for heating any of said components and/or said liquid mixture of components. U.S. patent application Ser. No. 133,068, now abandoned and the patent demonstrate the use of supercritical fluid, such as supercritical carbon dioxide fluid, as diluents in highly viscous organic solvent borne and/or highly viscous nonaqueous dispersions coatings compositions to dilute the compositions to application viscosity required for liquid spray techniques. They further demonstrate that the method is generally applicable to all organic solvent borne coatings systems.

European Patent Application 89 112823.3, published Jan. 17, 1990, is directed to a liquid coatings application process and apparatus in which supercritical fluid, such as supercritical carbon dioxide fluid, are used to reduce to application consistency viscous coatings compositions to allow for their application as liquid sprays. The coatings compositions are sprayed by passing the composition under pressure through an orifice into the environment of the substrate.

European Patent Application 89 112856.3, published Jan. 17, 1990, is directed to a process and apparatus for coating substrates by a liquid spray in which 1) supercritical fluid, such as supercritical carbon dioxide fluid, is used as a viscosity reduction diluent for coating formulations, 2) the mixture of supercritical fluid and coating formulation is passed under pressure through an orifice into the environment of the substrate to form the liquid spray, and 3) the liquid spray is electrically charged by a high electrical voltage relative to the substrate.

The above technologies amply demonstrate the applicability of supercritical fluids as carriers and viscosity reducers for transporting a variety of coating materials and effectively spraying them onto a coatable surface while reducing the amount of volatile organic compounds (VOCs) that are required for the application.

European Patent Application 90 105347.0, published Sep. 26, 1990, also relates to the use of supercritical fluids to replace VOCs is spray coating compositions. It is there indicated that low molecular weight polymer component makes it easier to atomize in a spray gun. To avoid the presence of elastic component of viscosity, the EP application recommends the use of polymers having a $M_w/M_n$ less than about 4, preferably less than about 3, and most preferably less than about 2. Table 2 of the EP publication describes the use of acrylic thermosetting oligomers having a $M_n$ of 1,000–2,000, a $M_w$ of 1,200–2,200, and a $M_w/M_n$ of 1.1–1.5.

The molecular weight of a polymer controls many of its physical properties, such as modulus, yield strength, fracture toughness, viscosity and solubility. As the molecular weight of a polymer is increased, most of these properties increase to a maximum and then plateau, whereas the solubility of a polymer decreases as its molecular weight is increased. Since many coatings are sprayed from solutions, their molecular weights must be chosen to balance solvent compatibility, solution viscosity and the required mechanical properties.

It is recognized that short chain acrylic oligomers are deficient in properties required of a useful commercial coating unless the acrylic oligomer is thermosetting by being capable of being crosslinked. Oligomers of this type, containing up to about 15 monomeric units[1] posses properties distinctive from a corresponding higher molecular weight polymer. It is through a crosslinking reaction that effective coating properties are achieved using these oligomers. Polymers having more monomer units than an oligomer pass through a structural phase that introduces significant physical and chemical properties than would not be present in the corresponding oligomer.

1. The definition of oligomer is not a fixed one. According to the Encyclopedia of Polymer Science and Technology, vol. 9, page 485: "Oligomers are the low-$M_w$, or low-DP, members of a homologous series, the high-$M_w$, of high-DP, members of which are polymers.— . . . oligomers are molecularly homogeneous polymer homologs of low molecular weight which show differences in their physical properties sufficiently clear to distinguish among them. Oligomers can in addition be isolated from their mixtures as chemical entities using classical fractionating methods."
The Polymer Handbook, 2nd Edition, page VI-2, states- "Oligomers are defined as the low members of the polymeric-homologous series, with molecular weights up to about 1000–2000."
Vilenchik et al., Acta Polymerica, 36 (1985) Nr. 3, state: "On the natural physical boundary between oligomers and proper polymers in the hydrodynamic behavior of macromolecules" indicate that the number of repeating units of an oligomer is in the range of 10–15 units.

The molecular weight distribution of a polymer also influences many of its physical properties and is often described in terms of polydispersity ($M_w/M_n$). In a typical free radical polymerization reaction, polymers with a heterogeneous molecular weight (polymer chains of different lengths) are produced. These systems are termed polydisperse, where $M_w/M_n$ typically ranges from about 2 to about 4. Anionic polymerization reactions (generally conducted at temperatures below $0^{0}$C) yield polymer chains of essentially the same length. These systems are termed monodisperse, where $M_w/M_n$ typically ranges from slightly above 1.0 to about 1.5. Such control of $M_w/M_n$ has been known to permit useful variation in polymer physical properties, such as glass transition temperature, hardness, heat distortion temperature, and melt viscosity.

Anionic polymerization is recognized to allow synthesis of polymers having a predictable molecular weight average and a very narrow molecular weight distributions, approaching the Poisson distribution. Morton, *Anionic Polymerization: Principles and Practice*, Academic Press, New York, 1983, page 9. Morton, at pages 169–174, discusses monodisperse polymers, and at pages 174–176, list a substantial number of polymers formed by anionic polymerization that possess narrow molecular weight distributions.

Group transfer polymerization (GTP) is an anionic polymerization technique for preparing monodisperse polymers at more moderate temperatures, e.g., room temperature. [2] According to Webster, [3] GTP is useful for producing "polymers [of]. . . low molecular weight and having a . . . narrow molecular weight distribution ($M_w/M_n$). At a given temperature, $M_w/M_n$ is primarily a function of the relative rates of initiation and polymerization. Rate of initiation, $r_i$, depends on initiator and co-catalyst type and relative concentrations. Polymerization rate, $r_p$, is a function of monomer reactivity and co-catalyst type and concentration. For monodispersity, $r_i/r_p$ is equal to or greater than 1, that is, the initiation rate is at least as fast as the polymerization rate and all chains grow simultaneously."[4]

2. See: Webster, O. W., "Living Polymers And Process For Their Preparation", U.S. Pat. No. 4,417,034, Nov. 22, 1983.
Farnham, W. B and Sogah, D. Y., "Process For Preparing Living Polymers", U.S. Pat. No. 4,414,372, Nov. 8, 1983.
3. See footnote 2.
4. Webster, supra, indicates that GTP has "the ability to copolymerize methacrylate and acrylate monomers, or combinations of acrylate monomers, for example, ethyl and sorbyl acrylates, to relatively monodisperse copolymers."

Narrow molecular weight polymers have significant advantages for use in solvent based coatings. The absence of low molecular weight polymer fractions gives cured coatings with better physical properties. In addition, the absence of high molecular weight fractions, as pointed out herein, allows for the preparation of high solids solutions from these polymers which have lower solution viscosities than do solutions containing polymers of the same average molecular weight prepared by free radical polymerization.

The Invention

This invention is directed to monodispersed acrylic polymer solutions containing dissolved supercritical, near supercritical or subcritical fluids that contain relatively low concentrations of VOC (volatile organic compounds) solvents. The invention involves an unexpected improved compatibility between monodispersed non-oligomeric acrylic polymers and supercritical, near supercritical or subcritical fluids that results in less requirement for the use of VOCs to dissolve the non-oligomeric acrylic polymer to form a solution having suitable viscosity and associated properties for coating applications.

This invention ascertains the compatibility of monodispersed non-oligomeric and non-dimeric[5] acrylic polymers with supercritical fluid, near supercritical fluid and subcritical fluid carbon dioxide. Acrylic thermoplastic polymers having a molecular weight suitable for use as a coating, a $M_w/M_n$ ratio of from 1 to about 1.5, preferably, from about 1 to about 1.4, and most preferably, from about 1.01 to about 1.3, have been found to be exceptionally useful in solution coating formulations for typical solution coating applications, e.g., in spray and other coating methods, using uniquely lower VOC solvent contents. This is accomplished by dissolution with or in the polymer of a supercritical fluid, near supercritical fluid or subcritical fluid, such as supercritical fluid, near supercritical fluid or subcritical fluid $CO_2$, to achieve the desired coating viscosity. Spray application of these systems can be achieved at higher solids (lower VOC) and reduced pressure, increasing the benefits and operational latitude of the process.

[5]. Hereinafter, these terms—non-oligomeric and non-dimeric—are characterized as "thermoplastic" which connotes a fundamental change in characteristics between the higher polymers of the invention and the lower polymers termed dimers and oligomers.

This invention relates to supercritical fluid-low VOC-containing thermoplastic acrylic polymeric coating solutions in which the polymer has either a $M_w$ or $M_n$ greater than 2,500, preferably greater than about 3,000, and a $M_w/M_n$ ratio of from 1 to about 1.5, as pointed out above. In another aspect of the invention, the thermoplastic acrylic polymer is, as such, a polymeric coating vehicle. IN this aspect, the polymer is not dependent upon crosslinking to introduce basic coating properties. In the most preferred embodiment of the invention, this invention relates to supercritical fluid-low VOC-containing thermoplastic acrylic polymeric coating solutions in which the polymer has either a $M_w$ or $M_n$ greater than 3,500, even greater than about 5,000, and a $M_w/M_n$ ratio of from about 1.01 to about 1.03.

In the most preferred embodiment of the invention, the monodispersed thermoplastic polymer used in the coating formulation has either a $M_w$ or $M_w$ greater than 5,000 and as high as 100,000, or greater.

Detailed Description of the Invention

The term "coating composition," as used herein, relates to any coating application, whether decorative, permanent, temporary, primary, secondary or tertiary coating, transitive, and the like. It includes paints, lacquers, enamels, varnishes, adhesives, release agents, lubricants, cleaning agent, agricultural coating, pharmaceutical coatings, and the like, to the extent applicable to the use of monodispersed thermoplastic acrylic polymers.

The invention covers the use of transportable coating compositions in that the liquid coating composition of the invention may be transported from one place to another, either in a confined container or in a piping of some sort. Transporting also includes the movement of the coating composition from a container through tubing and finally through a spray gun to a substrate on which it proceeds to solidify.

Table 1 shows relevant physical properties of two sets of thermoplastic polymers (prepared by free radical polymerization) to demonstrate the effect of molecular weight on solution viscosity and supercritical fluid $CO_2$ compatibility. The two polymer systems are acrylic copolymers of MMA (methyl methacrylate) and BA (n-butyl acrylate) with $M_n$'s ranging from 2000 to 12,000 g/mole. The first set of polymers was prepared from 79% MMA and 21% BA while the second set of polymers was prepared from 47% MMA and 53% BA. The experimental details are set forth in the corresponding enumerated examples below.

The solution viscosities and the $CO_2$ solubilities were determined from samples which were 58% ($\pm 2$) total solids in pentyl propionate. The viscosities were determined at room temperature using a Brookfield DV-II viscometer. The $CO_2$ compatibility is recorded as the maximum weight percent $CO_2$ that is compatible with the polymer at 1600 psi and 60° C., and is referred to as the normalized saturation point.

TABLE 1

| Ex. | Composition | $M_n$ | $M_w$ | $M_w/M_n$ | Viscosity (cps) | Tg (OC.) |
|---|---|---|---|---|---|---|
| 1 | 79MMA/21BA | 2125 | 3,722 | 1.75 | 405 | 23.9 |
| 2 | " | 3263 | 5,544 | 1.70 | 1213 | 32.8 |
| 3 | " | 5404 | 9,419 | 1.74 | 5505 | 32.1 |
| 4 | " | 9129 | 19,303 | 2.12 | 39333 | 44.1 |
| 5 | 47MMA/53BA | 2331 | 4339 | 1.86 | 129 | −10.8 |
| 6 | " | 3507 | 9603 | 2.74 | 262 | −1.2 |
| 7 | " | 4618 | 14740 | 3.19 | 846 | 2.4 |
| 8 | " | 11532 | 51521 | 4.47 | 3540 | 8.2 |

The viscosity of a polymer solution is known to increase as the molecular weight and glass transition temperature ($T_g$) of the polymer increases. This behavior for the two sets of acrylic polymers is illustrated in Table 1. Of the two sets, the copolymer with the higher $T_g$ (79% MMA/21% BA) gave the most dramatic increase in solution viscosity as the molecular weight increased.

Figure 1:
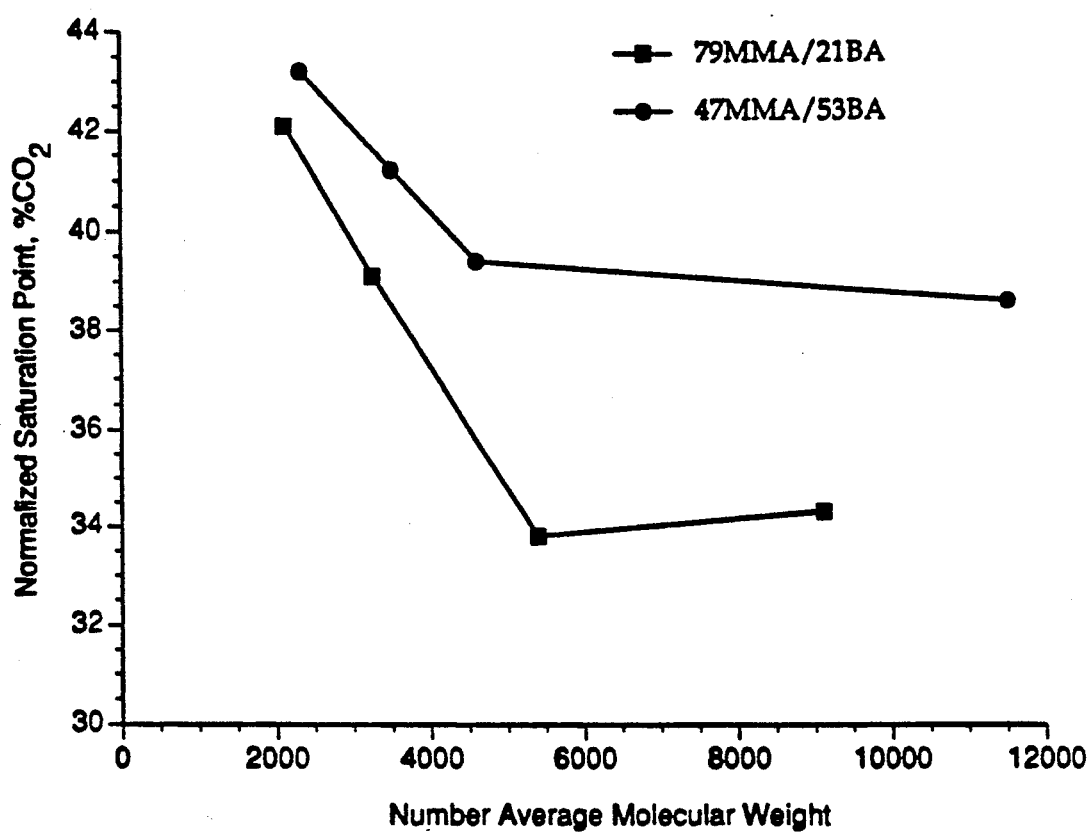
FIGS. 1 and 2 show the normalized saturation point as a function of $M_n$ and polymer composition.

FIG. 1 shows the normalized saturation point as a function of $M_n$ and polymer composition. The copolymers containing 47% MMA and 53% BA have higher normalized saturation points over the $M_n$ range studied than the copolymer containing 79% MMA and 21% BA. It should be noted that as the $M_n$'s of the polymers increase, their respective normalized saturation points drop to a minimum at a $M_n$ of approximately 5000 g/mole, then they plateau.

Figure 2:
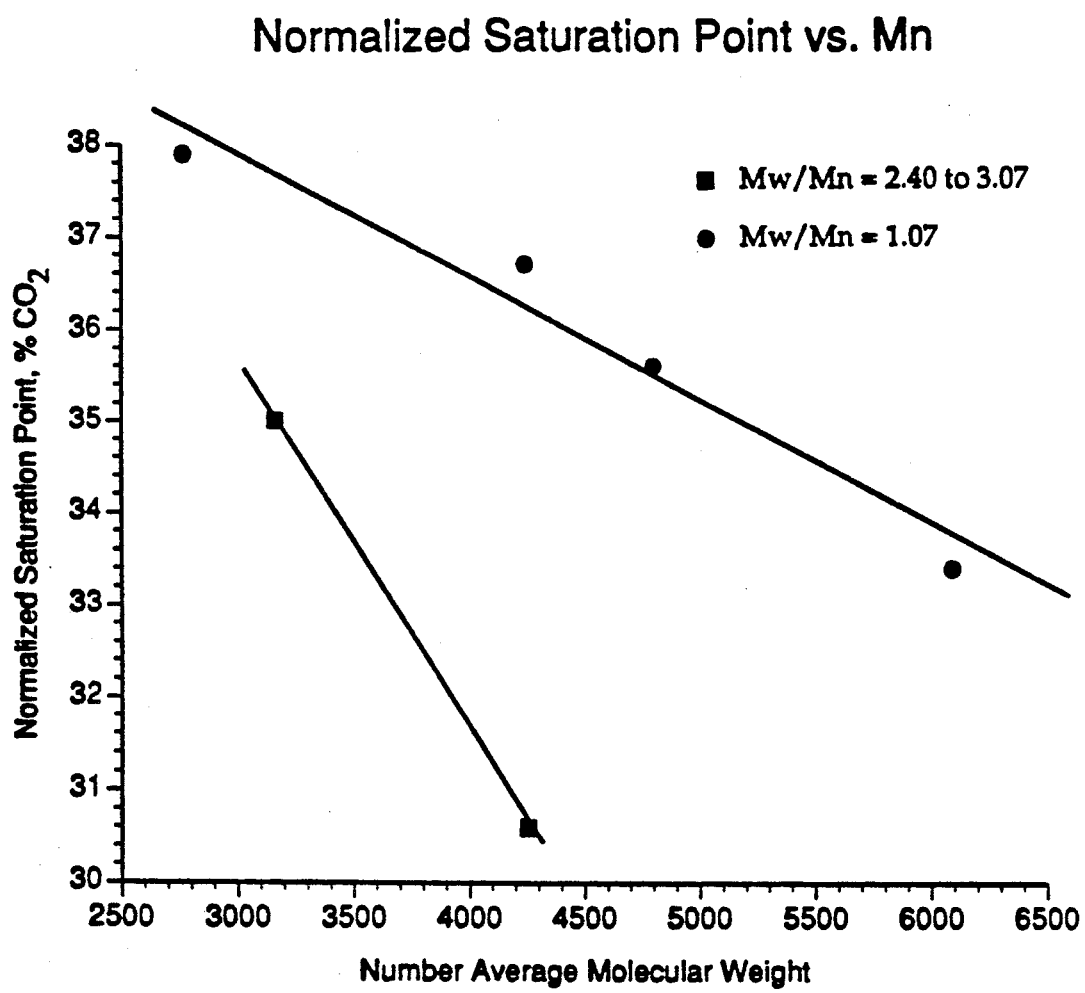

A second polymer system was used to investigate the influence of $M_n$ and polydispersity on $CO_2$ solubility. The composition of the polymer was 56.7% MMA, 34.8% EHNU (2-ethylhexyl methacrylate), and 8.5% MAA (methacrylic acid). The polymer was prepared by two different polymerization methods. The first method, free radical polymerization, gave polymers with a polydispersity ranging from about 2.4 to about 3.1. The second method, group transfer polymerization, gave polymers with a polydispersity of about 1.1, thus yielding monodispersed copolymers. Table 2 shows the effect of $M_n$ and polydispersity on the solution properties of these polymers at 51% total solids in pentyl propionate. Using the data from Table 2, the plots in FIG. 2 were generated. The data show that for a given $M_n$, the polymers with low polydispersities ($\simeq 1.1$) have higher normalized saturation points than those polymers with higher polydispersities ($\simeq 2.4$–3.1). A 6.1 percent increase in the normalized saturation point is observed as the polydispersity is reduced from 3.07 to 1.07 for $M_n$ of approximately 4000. A second comparison of the normalized saturation points as a function of $M_n$ and polydispersity is made in Table 3 for a different set of polymers (65.2% 34.8% EHMA). The polymers were dissolved in methyl PROPASOL acetate at 56% solids. Again the data show that the monodispersed polymers have greater supercritical fluid $CO_2$ solubility than the polydispersed polymers.

TABLE 2

| Ex. | Polymer | Polymerized by | $M_n$ | $M_w$ | $M_n/M_w$ | Viscosity (cps) | Wt. % $CO_2$ |
|---|---|---|---|---|---|---|---|
| 9 | 56.7% Methyl Methacrylate/ 34.8% 2-Ethylhexyl Methacrylate/ 8.5% Methacrylic Acid Terpolymer | Free Radical | 3164 | 7825 | 2.47 | 6530 | 35.0 |
| 10 | 56.7% Methyl Methacrylate/ 34.8% 2-Ethylhexyl Methacrylate/ 8.5% Methacrylic Acid Terpolymer | Free Radical | 4255 | 13079 | 3.07 | 70800 | 30.6 |
| 11 | 56.7% Methyl Methacrylate/ 34.8% 2-Ethylhexyl Methacrylate/ 8.5% Methacrylic Acid Terpolymer | Group Transfer | 2770 | 2980 | 1.07 | 1200 | 37.9 |
| 12 | 56.7% Methyl Methacrylate/ 34.8% 2-Ethylhexyl Methacrylate/ 8.5% Methacrylic Acid Terpolymer | Group Transfer | 4056 | 4330 | 1.07 | 3520 | 36.7 |
| 13 | 56.7% Methyl Methacrylate/ 34.8% 2-Ethylhexyl Methacrylate/ 8.5% Methacrylic Acid Terpolymer | Group Transfer | 4800 | 5130 | 1.06 | 7001 | 35.6 |
| 14 | 56.7% Methyl Methacrylate/ 34.8% 2-Ethylhexyl Methacrylate/ 8.5% Methacrylic Acid Terpolymer | Group Transfer | 6090 | 6490 | 1.07 | 10460 | 33.4 |

TABLE 3

| Ex. | Polymer | Polymerized by | $M_n$ | $M_w/M_n$ | Weight % $CO_2$ |
|---|---|---|---|---|---|
| 15 | 65.2% Methyl Methacrylate/ 34.8% | Free Radical | 3213 | 2.45 | 40.7 |

TABLE 3-continued

| Ex. | Polymer | Polymerized by | $M_n$ | $M_w/M_n$ | Weight % $CO_2$ |
|---|---|---|---|---|---|
| 16 | 65.2% Methyl Methacrylate/ 34.8% 2-Ethylhexyl Methacrylate Copolymers | Free Radical | 4341 | 2.91 | 38.8 |
| 17 | 65.2% Methyl Methylacrylate/ 34.8% 2-Ethylhexyl Methacrylate Copolymers | Group Transfer | 2919 | 1.22 | 42.8 |
| 18 | 65.2% Methyl Methacrylate/ 34.8% 2-Ethylhexyl Methacrylate Copolymers | Group Transfer | 4244 | 1.23 | 41.5 |

Figure 3:
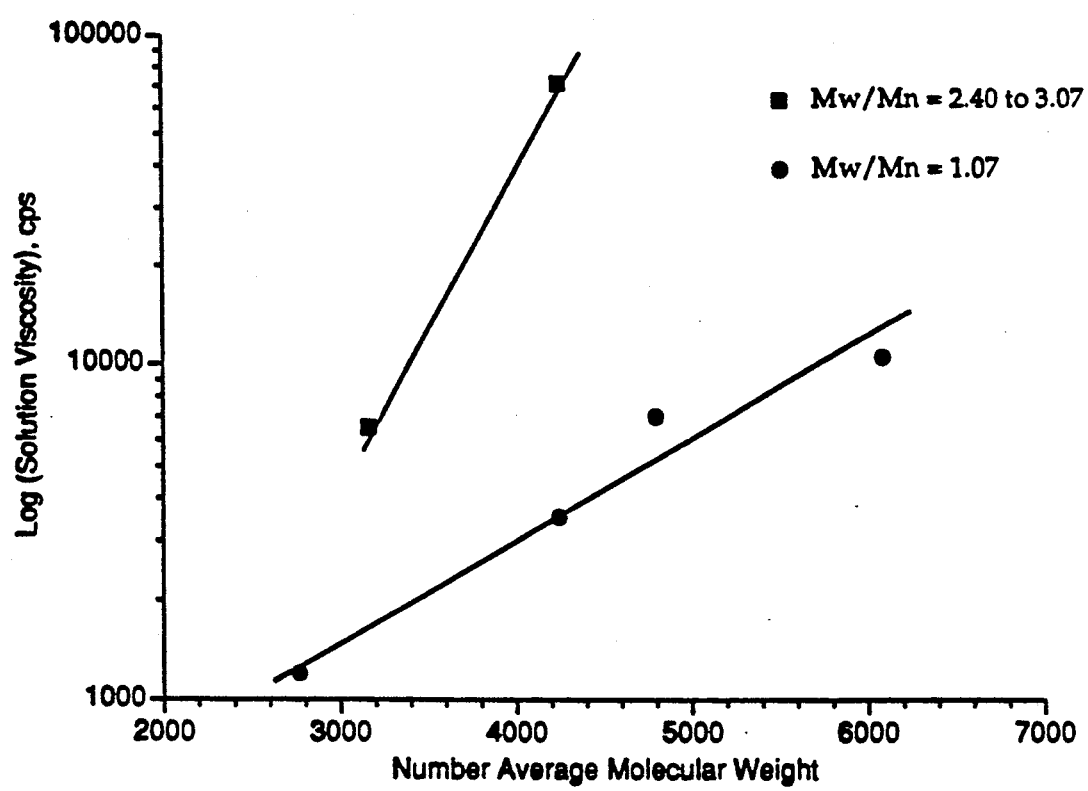
FIG. 3 shows the relationship of solution viscosity and $M_n$ of a number of polymers, one of which is monodispersed and another that is polydispersed.

In addition to higher saturation points, polymers prepared by group transfer polymerization have lower solution viscosities than polymers prepared by free radical polymerization due to the absence of the higher molecular weight fractions. FIG. 3 shows the effect of $M_n$ and polydispersity on solution viscosity. The viscosities of the polymer solutions prepared by free radical polymerization are several times greater than their counterparts prepared by GTP. For a given $M_n$, the $M_w$ (or more correctly, the $M_v$) has a direct influence on the solution viscosity of a polymer. Thus as $M_v$ increases for a given $M_n$, the solution viscosity of a polymer increases.

The polymers of this invention are of the acryhc type, that is, they are derived from the anionic polymerization of a monomer of the formula:

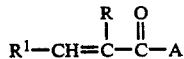

wherein A is one or more of the following groups:

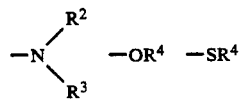

alone or with another suitably copolymerizable ethylenically unsaturated monomer that produces a monodispersed thermoplastic polymer of the desired molecular weight. In the above, $R^1$ is hydrogen, alkyl and aryl; $R^2$, $R^3$ and $R^4$ are each hydrogen or monovalent organic groups, such as illustrated below.

Monomers which are suitable for use in the practice of this invention are, in general, known compounds and include, but are not limited to, the following: acrylic acid, methacrylic acid, acrylamide, methacrylamide, methyl methacrylate; butyl methacrylate; sorbyl acrylate and methacrylate; lauryl methacrylate; ethyl acrylate; butyl acrylate; acrylonitrile; methacrylonitrile; 2-ethylhexyl methacrylate; 2-(dimethylamino)ethyl methacrylate; 2-(dimethylamino)ethyl acrylate; 3,3-dimethoxypropyl acrylate; 3-methacryloxypropyl acrylate; 2-acetoxyethyl methacrylate; p-tolyl methacrylate; 2,2-dimethylpropyl methacrylate, 2,2-dimethylbutyl methacrylate, 2,2,3,3,4,4,4-heptafluorobutyl acrylate; methylene malononitrile; ethyl 2-cyanoacrylate; N,N-dimethyl acrylamide; 4-fluorophenyl acrylate; 2-methacryloxyethyl acrylate and linoleate; propyl vinyl ketone; ethyl 2-chloroacrylate; glycidyl methacrylate; 3-methoxypropyl methacrylate; 2-[(1-propenyl)oxy]ethyl methacrylate and acrylate; phenyl acrylate; 3-(trimethoxysilyl)propyl methacrylate; allyl acrylate and methacrylate; mono-trifluoroethyl itaconate, bis-trifluoroethyl itaconate, monotrifluoroethyl maleate, 2,2,2-trifluoroethyl methacrylate, hexafluoroisopropyl methacrylate, pentadecafluorooctyl methacrylate, 2,2,3,3,3-pentafluoropropyl acrylate, perfluorooctyl methacrylate, 1,1,2,2-tetrahydro perfluorodecyl methacrylate, 1,1,2,2-tetrahydro perfluoroundecyl acrylate, trihydro perfluoroheptyl acrylate, vinyl trifluoroacetate, vinyl heptafluorobutyrate, pentafluorostyrene, vinylidene fluoride, vinyl fluoride, chlorotrifluoroethylene, perfluoropropyl vinyl ether, vinyl pivalate, vinyl 2,2-dimethylbutanoate, and the like.

Certain of the monomers may be reactive under polymerization conditions. To the extent that they are, such as in the case of $CO_2H$ and OH, they should be chemically protected, i.e. deactivated as to the functionality of the groups during the polymerization. Monomers containing such deactivated groups are useful in the preparation of polymers which, upon treatment to remove the protective group, have functional sites along the polymer chain. Monomers which contain sufficiently sterically hindered amine and alcohol groups that remain inert under reaction conditions may be used directly without deactivation.

The anionic polymerization may be carried out using conventional anionic polymerization conditions in the art, such as characterized by Morton, supra, Webster, supra, and Farnham et al., supra.

When using the anionic GTP, initiators for the polymerization reaction that are useful include: [(1-methoxy-2-methyl-1-propenyl)oxy]trimethylsilane; 2-(trimethylsilyl)isobutyronitrile; ethyl 2-(trimethylsilyl) acetate; methyl 2-methyl-2-(tributylstannyl) propanoate; [(2-methyl-1-cyclohexenyl) oxy] tributylstannane; trimethylsilyl nitrite; methyl 2 methyl-2-(trimethylgermanyl) propanoate; [(4,5-dihydro-2 furanyl) oxy] trimethylsilane; [(2-methyl-1propenylidene) bis (oxy)] bis[-trimethylsilane]; [(2-methyl-1-[2-(methoxymethoxy) ethoxy]-1-propenyl) oxy] trimethylsilane; methyl [(2-methyl-1-(trimethylsilyloxy)-1-propenyl) oxy] acetate; [(1-(methoxymethoxy)-2-methyl-1-propenyl) oxy] trimethylsilane; trimethyl α, α', α"-tris(trimethylsilyl)-1,3,5-benzenetriacetate; dimethyl α, α'-bis(trimethylsilyl)-1,3-benzenediacetate; [1,6-dimethoxy-1,5-hexadiene-1,6-diyl bis(oxy)] bis [trimethylsilane]; [(2-ethyl-1-propoxy-1-butenyl) oxy] ethyl dimethylsilane; ethyl 2-(trimethyl stannyl) propanoate; [(1-cyclohexenyl) oxy] trimethylstannane; [(2-methyl-1-butenylidene) bis-(oxy)] bis[trimethylsilane]; 2-(trimethylsily) propanenitrile; ethyl(trimethylgermanyl) acetate; [(1-((1-dec-2-enyl) oxy)-2-methyl-1-propenyl) oxy] trimethylsilane; phenyl 2-methyl-2-(tributylstannyl) propanoate; methyl 2-(triethylsilyl) acetate; dimethyl 2,5-bis(trimethylgermanyl) hexanedioate; [(2-methyl-1-cyclohexenyl) oxy] tributylstannane; [(1-methoxy-2-methyl-1-propenyl) oxy] phenyldimethylsilane; and [(2-methyl-1-[2-(trimethylsiloxy) ethoxy]-1-propenyl) oxy] trimethylsilane.

Preferred initiators include [(1-methoxy-2-methyl-1-propenyl) oxy] trimethylsilane; [(2-methyl-1-propenylidene) bis(oxy) bis [trimethylsilane]; trialkylsilyl nitrites;

and [(2-methyl-1-[2-(trimethylsiloxy) ethoxy]-1-propenyl) oxy] trimethylsilane. Trimethylsilyl nitrile is most preferred.

In accordance with art described techniques, functional sites can be provided along the polymer chains, or at the end of polymer chains by providing modifiers, such as water, in the reaction. This makes the polymer suitable for crosslinking, chain extension, chain branching, or for modifying properties such as water sorption, UV absorption, and the like, thereby enhancing the already existing favorable coating properties of the monodispersed thermoplastic acrylic polymers. In GTP, the initiator moiety forms one end of a polymer chain and as a result, the polymere; may be terminally functionalized by appropriate initiator selection and polymer treatment.

Co-catalysts used in GTP include zinc iodide, bromide, and chloride, mono- and dialkylaluminum halides, dialkylaluminum oxides, tris (dimethylamino) sulfonium difluorotrimethylsilicate, tris (dimethylamino) sulfonium cyanide, tetraphenyl arsonium cyanide, tris (dimethylamino) sulfonium azide, tetraethyl ammonium azide, bis (dialkylaluminum)oxides, boron trifluoride etherate, alkali metal fluorides, alkali metal cyanides, alkali metal azides, tris(dimethylamino) sulfonium difluoro triphenyl stannate, tetrabutylammonium fluoride, tetramethylammonium fluoride, and tetraethyl ammonium cyanide. Preferred co-catalysts include sources of fluoride ions, especially tris (dimethylamino) sulfonium difluorotrimethyl silicate and tetrabutyl ammonium fluoride; tetraalkylammonium cyanides; zinc bromide, and zinc chloride. Other co-catalysts include the independently discovered sources of bifluoride ions, such as, for example, tris (dimethylamino) sulfonium bifluoride, tetraalkylammonium bifluorides, tetraarylphosphonium bifluorides, bifluorides of the alkali metals, especially potassium, and ammonium bifluoride.

Anionic polymerization, including GTP, may be carried out at about $-100°$ C. to about $150°$ C., preferably $0°$ C. to $50°$ C., most preferably at ambient temperature. A solvent is desirable but not essential to the reaction. The monomers are typically liquids and thus are polymerizable without a solvent, although a solvent is beneficial in controlling temperature during exothermic polymerization. When a solvent is used, the monomer may be dissolved therein at concentrations of at least 1 wt. %, preferably at least 10 wt %. The initiator is employed at a concentration such that the monomer/initiator molar ratio is greater than 1, preferably greater than 5. The co-catalyst is normally present in such an amount that the molar ratio of initiator to co-catalyst is in the range 0.1 to 500, preferably 1 to 10.

Suitable solvents are aprotic liquids in which the monomer, initiator and co-catalyst are sufficiently soluble for reaction to occur; that is, the materials are dissolved at the concentrations employed. Suitable solvents include ethyl acetate, propionitrile, toluene, xylene, bromobenzene, dimethoxyethane, diethoxyethane, diethylether, tetramethylene sulfone, N,N-dimethyl formamide, N,N-dimethyl acetamide, N-methyl pyrrolidone, anisole, 2-butoxy ethoxy trimethylsilane, Cellosolve acetate, crown ethers such as 18-crown-6, acetonitrile, and tetrahydrofuran.

In the polymerization process of the invention, it is preferable to charge the initiator, co-catalyst, and solvent, if used, to the polymerization vessel before adding the monomer(s). Although it is preferable to charge all necessary initiator, co-catalyst and solvent to the polymerization vessel before adding monomer(s), subsequent polymerization rate being controlled by monomer addition, further additions of co-catalyst may sometimes be necessary to sustain polymerization.

The final (non-living) polymeric product obtained is formed by exposing the "living" polymer to an active hydrogen source, such as moisture or an alcohol, for example, methanol. The "living" polymers remains "living" for substantial periods provided they are protected from active hydrogen sources such as water or alcohols. Solutions of "living" polymers in supercritical fluid $CO_2$ alone or with inert solvents, such as hydrocarbons, are especially useful for quenching the "living" polymers.

The monodispersed anionic polymerized thermoplastic polymers may be separated from the polymerization reaction by conventional means, such as by precipitation, distillation, extraction and the like procedures, and thereafter formulated into a coating composition, using traditional methods. The coating compositions may contain dyes, pigments, reinforcing agent, crosslinkers, and the like.

The invention contemplates the use of coalescing agents in the polymer composition where there is a need for solvating or plasticizing the polymer when it is removed from the composition and disassociated from the supercritical fluid or near supercritical fluid. Solvents, such as those described above, and conventional plasticizers may be incorporated into the composition of the invention for assisting in the application of the polymer from association with the supercritical fluid, near supercritical fluid and subcritical fluid.

The reference to supercritical fluids as solvents for high polymeric solids compositions means the dissolving of the supercritical fluid in the polymer. The invention is not limited to the dissolution of the supercritical fluid by the polymer or vice versa; the invention encompasses as well, dispersions and suspensions of the polymer with the supercritical fluid. Therefore, where there is the tendency to lump solvency as the function of the supercritical fluid, it is to be understood that supercritical fluid solvency is intended to mean the polymer combined with the supercritical fluid is provided as a more dilute flowable composition by virtue of the supercritical fluid, and therefore, solvency means dissolving, suspending or dispersing of polymeric solids composition with the supercritical fluid so that the combined fluidity is characterizable by a lower viscosity and a more fluid composition for transport.

The supercritical fluid phenomenon is well documented, see pages F-62–F-64 of the CRC Handbook of Chemistry and Physics, $67^{th}$ Edition, 1986–1987, published by the CRC Press, Inc., Boca Raton, Fla. At high pressures above the critical point, the resulting supercritical fluid, or "dense gas", will attain densities approaching those of a liquid and will assume some of the properties of a liquid. These properties are dependent upon the fluid composition, temperature, and pressure.

The compressibility of supercritical fluids is great just above the critical temperature where small changes in pressure result in large changes in the density of the supercritical fluid. The "liquid-like" behavior of a supercritical fluid at higher pressures results in greatly enhanced solubilizing capabilities compared to those of the "subcritical" compound, with higher diffusion coefficients and an extended useful temperature range compared to liquids. Compounds of high molecular weight can often be dissolved in the supercritical fluid at relatively low temperatures. An interesting phenomenon associated with supercritical fluids is the occurrence of a "threshold pressure" for solubility of a high molecular weight solute. As the pressure is increased, the solubility of the solute will often increase by many orders of magnitude with only a small pressure increase.

Near-supercritical liquids also demonstrate solubility characteristics and other pertinent properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing solubility for some solutes.

A subcritical fluid is a material at a temperature and/or pressure so that it is below its critical point. A subcritical fluid may be (i) below its critical temperature while being above its critical pressure, or (ii) below its critical pressure while being above its critical temperature, or (iii) below both its critical temperature and critical pressure. Subcritical fluids are useful in this case because of the low viscosity of the monodispersed acrylic polymers in the coating composition of the invention. In this case, the subcritical fluid is a gas at standard conditions of 0° C. and one atmosphere pressure ("STP" conditions).

Examples of compounds which are known to have utility as supercritical fluids are given in Table B.

TABLE B

| Compound | Boiling Point (°C.) | Critical Temperature (°C.) | Critical Pressure (atm) | Critical Density (g/cm$^3$) |
|---|---|---|---|---|
| CO$_2$ | −78.5 | 31.3 | 72.9 | 0.448 |
| NH$_3$ | −33.35 | 132.4 | 112.5 | 0.235 |
| H$_2$O | 100.00 | 374.15 | 218.3 | 0.315 |
| N$_2$O | −88.56 | 36.5 | 71.7 | 0.45 |
| Xenon | −108.2 | 16.6 | 57.6 | 0.118 |
| Krypton | −153.2 | −63.8 | 54.3 | 0.091 |
| Methane | −164.00 | −82.1 | 45.8 | 0.2 |
| Ethane | −88.63 | 32.28 | 48.1 | 0.203 |
| Ethylene | −103.7 | 9.21 | 49.7 | 0.218 |
| Propane | −42.1 | 96.67 | 41.9 | 0.217 |
| Pentane | 36.1 | 196.6 | 33.3 | 0.232 |
| Methanol | 64.7 | 240.5 | 78.9 | 0.272 |
| Ethanol | 78.5 | 243.0 | 63.0 | 0.276 |
| Isopropanol | 82.5 | 235.3 | 47.0 | 0.273 |
| Isobutanol | 108.0 | 275.0 | 42.4 | 0.272 |
| Chlorotrifluoromethane | −31.2 | 28.0 | 38.7 | 0.579 |
| Monofluoromethane | −78.4 | 44.6 | 58.0 | 0.3 |
| Cyclohexanol | 155.65 | 356.0 | 38.0 | 0.273 |

Many other supercritical compounds are cited in the aforementioned CRC Handbook of Chemistry and Physics, supra.

Due to the low cost, low toxicity and low critical temperature of carbon dioxide, supercritical carbon dioxide fluid is preferably used in the practice of the present invention. For many of the same reasons, nitrous oxide (N$_2$O) is a desirable supercritical fluid in the practice of the present invention. However, use of any of the aforementioned supercritical fluids and mixtures thereof are to be considered within the scope of the present invention.

The solvency of supercritical carbon dioxide is similar to that of a lower aliphatic hydrocarbon and, as a result, one can consider supercritical carbon dioxide as a replacement for a hydrocarbon solvent.[6] In addition to the environmental benefit of replacing hydrocarbon solvents with supercritical carbon dioxide, there is a safety benefit also, because carbon dioxide is nonflammable and nontoxic.

[6]. However, this statement of an alleged equivalency cannot be extended across the board. As pointed out by McHugh et al., *Supercritical Fluid Extraction*, Butterworths (publisher) Boston, Mass., (1986), at pages 156–7, a fluid fluoroalkyl ether polymer exhibits better solubility in supercritical carbon dioxide than in hexane.

The thermoplastic polymer may be employed, as indicated above, without the use of a solvent other than the supercritical fluid, near supercritical fluid or subcritical fluid. The active solvent(s) other than the supercritical fluid suitable in the practice of this invention includes any solvent or mixture of solvents that is capable of dissolving, dispersing or suspending the polymer in combination with the supercritical fluid. It is apparent that the selection of solvent will be dependent upon the polymer used.

In addition to the monodispersed thermoplastic polymer that is contained in the solids fraction, additives that are typically utilized in coating may also be used. For example, pigments, pigment extenders, metallic flakes, fillers, drying agents, anti-foaming agents, anti-skinning agents, wetting agents, ultraviolet absorbers, crosslinking agents (if the monodispersed thermoplastic polymer is provided with crosslinkable functionality), and mixtures thereof, may be utilized in the precursor composition of the present invention.

In connection with the use of the various additives noted above, it is particularly desirable for pigments to be present in the precursor composition inasmuch as they have been found to aid in the diffusion of the supercritical fluid from the sprayed composition resulting in improved atomization.

The solvent fraction of the coating composition of the present invention includes at least one solvent in which the monodispersed thermoplastic polymer is at least partially soluble. While the solvents that are suitable for use in the present invention include any solvent or mixtures of solvent that is capable of dissolving, dispersing or suspending the solids fraction when admixed with the supercritical fluid, as with the monodispersed thermoplastic polymer, there are preferred solvents and solvent mixtures which are particularly desirable. Such preferred solvents possess certain desirable characteristics which make them generally more suitable for admixture with a supercritical fluid followed by spraying such admixture onto a substrate material. Generally, the selection of a particular solvent or solvent mixture depends on the particular monodispersed polymeric compounds being used.

Suitable solvents which may be utilized with the monodispersed thermosplastic polymer include ketones such as acetone, methyl ethyl ketone, methyl isobutyl ketone, mesityl oxide, methyl amyl ketone, cyclohexanone and other aliphatic ketones; esters such as methyl acetate, ethyl acetate, alkyl polycarboxylic acid esters; ethers such as methyl t-butyl ether, dibutyl ether, methyl phenyl ether and other aliphatic or alkyl aromatic ethers; glycol ethers such as ethoxy ethanol, butoxy ethanol, ethoxy 2-propanol, propoxy ethanol, butoxy propanol and other glycol ethers; glycol ether esters such as butoxy ethoxy acetate, ethyl 3-ethoxy propionate and other glycol ether esters; alcohols such as methanol, ethanol, propanol, iso-propanol, butanol, iso-butanol, amyl alcohol and other aliphatic alcohols; aromatic hydrocarbons such as toluene, xylene, and other aromatics or mixtures of aromatic solvents; aliphatic hydrocarbons such as VM&P naphtha and mineral spirits, and other aliphatics or mixtures of aliphatics; nitro alkanes such as 2-nitropropane. A review of the structural relationships important to the choice of solvent or solvent blend is given by Dileep et al., *Ind. Eng. Chem.* (Product Research and Development) 24, p. 162 (1985) and Francis, A. W., *J. Phys. Chem.* 58, p. 1099 (1954).

In general, solvents suitable for the present invention should have the desired solvency characteristics as aforementioned and also the proper balance of evaporation rates so as to ensure good coating formation. In other words, the solvent fraction should have a proper blend of fast and slow solvents.

More specifically, solvents having fast evaporation rates are needed to help solubilize the solids fraction, as well as help reduce viscosity, and to substantially leave the admixed coating composition once it has been sprayed and before the atomized droplets contact the substrate. Correspondingly, solvents having slow evaporation rates are also needed to help solubilize the solids fraction, but these solvents are primarily needed to be present on the substrate after the atomized droplets have been applied so as to provide a suitably low viscosity to produce enough flow-out to obtain a uniform and continuous coating.

However, too much of the fast solvent will produce a dry coating not having enough flow-out. Conversely, too much of the slow solvent will produce a coating having sagging and running defects and will not readily be dried thereby hindering the early handling of such a coated substrate.

Based on a relative evaporation rate (RER) to a butyl acetate standard equal to 100 using ASTM Method D3599 at 25° C. and one atmosphere pressure, the solvent fraction desirably has the following composition of fast and slow solvents as represented by corresponding RER values:

| Wt. % of Total Solvent Fraction | RER |
|---|---|
| 30–100% | <50 |
| 0–70% | 50–100 |
| 0–40% | 101–250 |
| <10% | >250 |

More preferably, the solvent fraction has the following composition:

| Wt. % of Total Solvent Fraction | RER |
|---|---|
| 40–100% | <50 |
| 0–60% | 50–100 |
| 0–30% | 101–250 |
| <5% | >250 |

The surface tension of a solvent represents another characteristic of the solvent fraction which desirably is optimized so as to make it particularly suitable for admixture with a supercritical fluid for spray applications. Specifically, a desirable solvent has less surface tension. The more so, the better. Accordingly, solvents with low surface tension properties provide good atomization of the coating composition. They provide a fine aerosol. A fine aerosol desirably facilitates the escape of the supercritical fluid from the sprayed admixed coating composition prior to contacting the substrate.

Also, solvents with low surface tension properties facilitate the formation of good quality coatings on the substrate by aiding diffusion of any residual supercritical fluid from the applied coating. In the same manner, the low surface tension solvents help to suppress the formation of surface bubbles caused by escaping residual supercritical fluid. Additionally, solvents with low surface tension properties provide fast wetting and spreading characteristics which aid in the formation of a defect-free, uniform coating on the substrate.

Preferably, the solvent fraction has a surface tension at 25° C. which is less than 35 dynes/centimeter. More preferably, the surface tension is less than 30 dynes/centimeter, for example, 23–28 dynes/centimeter.

Illustrative of such solvents are toluene, VM&P naphtha, butyl acetate pentyl propionate, glycol ethers, methyl PROPASOL® acetate, UCAR® Ester EEP (both manufactured by Union Carbide Chemical & Plastics, Company, Danbury, Conn.), and the like. Low surface tension may be achieve by conventional additives to the coating composition of this invention. These additives suppress the surface tension of the composition as a whole. Such additives include surface active materials, commonly known as surfactants, that are well known to those in the art as effective in either the solvent fraction or in the coating composition as a whole.

As the admixed coating composition containing the mixture of polymer, solvent and supercritical fluid, near supercritical fluid or subcritical fluid is sprayed, evaporation of a fast solvent contributes to overall cooling of the sprayed composition. Inasmuch as the solubility of most supercritical fluids, near supercritical fluid or subcritical fluid, particularly carbon dioxide, is higher at cooler temperatures, such cooling manifestly hinders the diffusion of the supercritical fluid, near supercritical fluid or subcritical fluid from the sprayed composition. It is desirable to have essentially all of the fluid escape from the admixed coating composition once it has been sprayed, so that essentially none of it is left once the atomized liquid droplets contact the substrate.

In this connection, the term "liquid droplets" is meant to define a droplet containing a portion of the solids fraction as well as a portion of the solvent fraction, in addition to any entrained supercritical fluid, near supercritical fluid or subcritical fluid that may still be present in such droplet.

In order to help minimize the cooling effect caused by evaporation of the fast solvent, it is desirable that the solvent fraction have an overall low heat of vaporization. Preferably, the solvent fraction has an overall low heat of vaporization of less than 110 calories per gram of solvent fraction and more preferably, less than about 100 calories per gram of solvent fraction. Desirably, the overall heat of vaporization of the solvent fraction is in the range of from about 65 to about 95 calories/gram.

To minimize the unnecessary release of solvent vapors into the atmosphere during the spray application of the admixed coating compositions, the amount of solvent used in the coating compositions should be less than that required to produce a mixture of monodispersed thermoplmtic polymer and solvent having a viscosity which would permit its application by liquid spray techniques. In other words, the inclusion of the solvent fraction should be minimized such that the diluent effect due to the solubilization of the supercritical fluid, near supercritical fluid or subcritical fluid in the polymer is fully utilized.

The viscosity of the coating composition should be low enough such that there is enough solvent present to provide proper coalescence upon the substrate once the composition is sprayed while still being high enough to allow for a reduction in solvent usage so as to maximize the utilization of the supercritical fluid, near supercritical fluid or subcritical fluid diluent and to concomitantly facilitate good atomization and coating formation.

The viscosity of the monodispersed thermoplastic acrylic polymer coating composition should also be such that when supercritical fluid, near supercritical fluid or subcritical fluid is added, it is possible to add enough of it without entering the two fluid phase region, such that the viscosity is lowered to less than about 300 centipoise, above the critical temperature and pressure of the supercritical fluid, when used, or below such conditions when near supercritical fluid or subcritical fluid is used, so as to render the mixture suitable for spray application. More preferably, the admixed liquid coating composition has a viscosity that is less that about 150 centipoise and preferably has a viscosity in the range of from about 5 to 150 centipoise. Most preferably, the viscosity of the admixture of solids fraction, solvent fraction and supercritical fluid, near supercritical fluid or subcritical fluid is in the range of from about 10 to about 50 centipoise.

More particularly, the liquid mondispersed thermoplastic acrylic polymer coating composition should have a compatibility with the supercritical fluid, near supercritical fluid or subcritical fluid, above the critical temperature and pressure of the supercritical fluid, or lower in the case of the near supercritical fluid or the subcritical fluid, so that at least 5% by weight thereof in the liquid composition. Preferably, the dilutancy should be at least 15% by weight of the supercritical fluid, near supercritical fluid or subcritical fluid in the mixture, and more preferably, about 20 to 50% or greater by weight of supercritical fluid, near supercritical fluid or subcritical fluid, per liter of mixture. Most preferably, it is in the range of from about 25% to about 35% by weight.

The coating composition containing the monodispersed polymer, after having been admixed with supercritical fluid, near supercritical fluid or subcritical fluid, is sprayed onto a substrate to form a liquid coating thereon containing solids fraction, a portion of the solvent fraction, and any residual gas that may be left, by passing the admixed liquid mixture under pressure through an orifice into the environment of the substrate to form a liquid spray.

The spray pressure used in the practice of the present invention is a function of the coating formulation, the supercritical fluid, near supercritical fluid or subcritical fluid being used, and the viscosity of the liquid mixture. The minimum spray pressure is typically at or slightly below the critical pressure of the supercritical fluid. Generally the pressure will be below about 5000 psi. Preferably, the spray pressure is above the critical pressure of the supercritical fluid and below about 3000 psi. If the supercritical fluid is supercritical carbon dioxide fluid, the preferred spray pressure is between about 1070 psi and about 3000 psi. The most preferred spray pressure is between about 1200 psi and about 2500 psi.

The spray temperature used in the practice of the present invention is a function of the coating formulation, the supercritical fluid, near supercritical fluid or subcritical fluid being used, and their concentration in the liquid mixture. The minimum spray temperature is at or slightly below the critical temperature of the supercritical fluid. The maximum temperature is the highest temperature at which the components of the liquid mixture are not significantly thermally degraded during the time that the liquid mixture is at that temperature.

If the supercritical fluid is supercritical carbon dioxide fluid, because the supercritical fluid escaping from the spray nozzle could cool to the point of condensing solid carbon dioxide and any ambient water vapor present due to high humidity in the surrounding spray environment, the spray composition is preferably heated prior to atomization. The minimum spray temperature is about 31° C. The maximum temperature is determined by the thermal stability of the components in the liquid mixture. The preferred spray temperature is between 35° C. and 90° C. The most preferred temperature is between 45° C. and 75° C. Generally liquid mixtures with greater amounts of supercritical carbon dioxide fluid require higher spray temperatures to counteract the greater cooling effect.

Typically, the spray undergoes rapid cooling while it is close to the orifice, so the temperature drops rapidly to near or below ambient temperature. If the spray cools below ambient temperature, entrainment of ambient air into the spray warms the spray to ambient or near ambient temperature before the spray reaches the substrate. This rapid cooling is beneficial, because less active solvent(s) evaporates in the spray in comparison to the amount of solvent lost in conventional heated airless sprays. Therefore a greater proportion of the active solvent is retained in the coating formulation to aid leveling of the coating formulation on the substrate. Conventional heated airless sprays also cool to ambient temperature before reaching the substrate, because of solvent evaporation and entrainment of ambient air.

The spray temperature may be obtained by heating the liquid mixture before it enters the spray gun, by heating the spray gun itself, by circulating the heated liquid mixture to or through the spray gun to maintain the spray temperature, or by a combination of methods. Circulating the heated liquid mixture through the spray gun is preferred, to avoid heat loss and to maintain the desired spray temperature. Tubing, piping, hoses, and the spray gun are preferably insulated or heat traced to prevent heat loss.

The environment in which the liquid spray of the composition of the present invention is conducted is not narrowly critical. However, the environmental pressure should be less than that required to maintain the supercritical fluid component of the liquid spray mixture in the supercritical state. Preferably, the present invention is conducted in air under conditions at or near atmospheric pressure. Other gas environments can also be used, such as air with reduced oxygen content or inert gases such as nitrogen, carbon dioxide, helium, argon, xenon, or a mixture. Oxygen or oxygen-enriched air is not desirable, because oxygen enhances the flammability of organic components in the spray.

The present process may be used to apply coatings by the application of liquid spray to a variety of substrates. The choice of substrates is therefore not critical in the practice of the present invention. Examples of suitable substrates include but are not limited to metal, wood, glass, plastic, paper, cloth, ceramic, magonry, stone, cement, asphalt, rubber, and composite materials. The substrate may be a conductor or a dielectric.

There are a broad variety of spray devices that one may use in carrying out the invention. Essentially any spray gun may be used, from conventional airless and air-assisted airless spray devices to electrostatic spray devices. The choice of spray device is dependent upon the kind of application in which the invention is used.

Airless spray uses a high pressure drop across the orifice to propel the coating formulation through the orifice at high velocity. Upon exiting the orifice, the high-velocity liquid breaks up into droplets and disperses into the air to form a liquid spray. Sufficient momentum remains after atomization to carry the droplets to the substrate. The spray tip is contoured to modify the shape of the liquid spray, which is usually a round or elliptical cone or a flat fan. Turbulence promoters are sometimes inserted into the spray nozzle to aid atomization. Spray pressures typically range from 700 to 5000 psi. The pressure required increases with fluid viscosity.

Air-assisted airless spray combines features of air spray and airless spray. It uses both compressed air and high pressure drop across the orifice to atomize the coating formulation and to shape the liquid spray, typically under milder conditions than each type of atomization is generated by itself. Generally the compressed air pressure and the air flow rate are lower than for air spray. Generally the liquid pressure drop is lower than for airless spray, but higher than for air spray. Liquid spray pressures typically range from 200 to 800 psi. The pressure required increases with fluid viscosity.

The present invention may utilize compressed gas to assist formation of the liquid spray and/or to modify the shape of the liquid spray that comes from the orifice. The assist gas is typically compressed air at pressures from 5 to 80 psi, with low pressures of 5 to 20 psi preferred, but may also be air with reduced oxygen content or inert gases such as compressed nitrogen, carbon dioxide, helium argon, or xenon, or a mixture of them. Compressed oxygen or oxygen enriched air, as noted above, is not desirable because oxygen enhances the flammability of the organic components in the spray. The assist gas is directed into the liquid spray as one or more high-velocity jets of gas, preferably arranged symmetrically on each side of the liquid spray to balance each other. The assist gas jets will preferably come from gas orifices built into the spray tip and/or nozzle. The assist gas may also issue from an opening in the spray tip or nozzle that is a concentric annular ring that is around and centered on the liquid orifice, to produce a hollow-cone high-velocity jet of gas that converges on the liquid spray, but this creates a larger flow of assist gas that is not as desirable. The concentric annular ring may be divided into segments, to reduce gas flow rate, and it may be elliptical instead of circular, to shape the spray. Preferably the flow rate and pressure of the assist gas are lower than those used in air spray. The assist gas may be heated to counteract the cooling effect of the supercritical fluid diluent in the liquid spray.

Airless spray and air-assisted airless spray can also be used with the liquid coating formulation heated or with the air heated or with both heated. Heating reduces the viscosity of the liquid coating formulation and aids atomization.

The material of construction of the orifice is not critical in the practice of the present invention, provided the material possesses necessary mechanical strength for the high spray pressure used, has sufficient abrasion resistance to resist wear from fluid flow, and is inert to chemicals with which it comes into contact. Any of the materials used in the construction of airless spray tips, such as boron carbide, titanium carbide, ceramic, stainless steel or brass, is suitable, with tungsten carbide generally being preferred.

Suitable orifice sizes generally range from about 0.004-inch to about 0.072-inch diameter. Because the orifices are generally not circular, the diameters referred to are equivalent to a circular diameter. The proper selection is determined by the orifice size that will supply the desired amount of coating and accomplish proper atomization for it. Generally smaller orifices are desired at lower viscosity and larger orifices are desired at higher viscosity. Smaller orifices give finer atomization but lower output. Larger orifices give higher output but poorer atomization. Finer atomization is preferred in the practice of the present invention. Therefore small orifice sizes from about 0.004-inch to about 0.025-inch diameter are preferred. Orifice sizes from about 0.007-inch to about 0.015-inch diameter are most preferred.

The designs of the spray tip that contains the spray orifice and of the spray nozzle that contains the spray tip are not critical to the practice of the present invention. The spray tips and spray nozzles should be essentially free of protuberances near the orifice that could/would interfere with the spray.

The shape of the spray is not critical to the practice of the present invention but it can be important in some applications of the invention. The spray may be in the shape of a cone that is circular or elliptical in cross section or the spray may be in the shape of a flat fan, but the spray is not limited to these shapes. Sprays that are flat fans or cones that are elliptical in cross section are preferred for applications requiring a broad sweeping deposition of the coating. In those cases, wide-angle fans are most preferred.

The distance from the orifice to the surface is not critical. Generally the substrate in which a broad deposition of the coating is effected will be sprayed from a distance of about 4 inches to about 24 inches. A distance of 6 inches to 18 inches is preferred. A distance of 8 inches to 14 inches is most preferred.

Devices and flow designs that promote turbulent or agitated flow in the liquid mixture prior to passing the liquid mixture under pressure through the orifice may also be used in the practice of the present invention. Such techniques include but are not limited to the use of pre-orifices, diffusers, turbulence plates, restrictors, flow splitters/combiners, flow impingers, screens, baffles, vanes, and other inserts, devices, and flow networks that are used in electrostatic, airless spray and air-assisted airless spray.

Filtering the liquid mixture prior to flow through the orifice is desirable in order to remove particulates that might plug the orifice. This can be done using conventional high-pressure paint filters. A filter may also be inserted at or in the gun and a tip screen may be inserted at the spray tip to prevent orifice plugging. The size of the flow passages in the filter should be smaller than the size of the orifice, preferably significantly smaller.

Electrostatic forces are commonly utilized with orifice sprays such as air spray, airless spray, and air-assisted airless spray to increase the proportion of coating composition that is deposited onto the substrate from the fluid spray. This is commonly referred to as increasing the transfer efficiency. This is done by using a high electrical voltage relative to the substrate to impart a negative electrical charge to the spray. The substrate is electrically grounded. This creates an electrical force of attraction between the fluid spray particles and the surface, which causes particles that would otherwise miss the surface to be deposited onto it. When the electrical force causes particles to be deposited on the edges and backside of the substrate, this effect is commonly referred to as wrap around. The surface should be electrically conducting or be given a conducting surface before being sprayed.

The fluid spray can be electrically charged at any stage of the spray formation process. It can be charged by applying high electrical voltage and electrical current 1) within the spray gun, by direct contact with electrified walls or internal electrodes before passing through the orifice; 2) as the fluid emerges from the orifice, by electrical discharge from external electrodes located near the orifice and close to the spray; or 3) away from the orifice, by passing the fluid spray through or between electrified grids or arrays of external electrodes before the spray reaches the surface.

Electrically charging the fluid spray as it emerges from the orifice is widely used. Usually a short pointed metal wire, which extends from the spray nozzle to beside the spray, is used as the electrode. When a high electrical voltage is applied to the electrode, electrical current flows from the point of the electrode to the fluid spray, which becomes charged. This method is used for air spray, airless spray, and air-assisted airless spray guns. It is used for both hand spray guns and automatic spray guns. Generally the electrical voltage ranges from 30 to 150 kilovolts. Coating formulations that are sufficiently conductive will leak electrical charge through the fluid to the material supply system; these systems must be isolated from electrical ground so that the system itself becomes electrified. For safety reasons, the voltage of hand spray guns is usually restricted to less than 70 kilovolts and the equipment is designed to automatically shut off the voltage when the current exceeds a safe level. Generally for hand spray guns the useful range of electrical current is between 20 and 100 microamperes and optimum results are obtained with coating formulations that have very low electrical conductivity, that is, very high electrical resistance.

Methods of electrostatic charging are known to those who are skilled in the art of conventional electrostatic spraying. Supercritical carbon dioxide fluid surprisingly has been found to be an insulating solvent with good electrical properties for electrostatic spraying. The fluid sprays give good electrostatic wrap around the substrate. This shows that the particles are highly charged and retain the electric charge.

Humid air can cause electrostatic sprays to lose their electrical charge more quickly than dry air; hence the electrostatic attraction to the substrate and wrap around is less effective. The supercritical carbon dioxide fluid diluent is beneficial for spraying in a humid environment, because the carbon dioxide as it vents from the spray tends to displace the humid air surrounding the spray. This helps the spray to retain its electric charge longer. When compressed air is used to assist electrostatic atomization, dry air is favored over humid air.

For electrostatic spraying, the substrate is preferably an electrical conductor such as metal. But substrates that are not conductors or semiconductors can also be sprayed. Preferably they are pretreated to create an electrically conducting surface. For instance, the substrate can be immersed in a special solution to impart conductivity to the surface.

The method of generating the high electrical voltage and electrical current is not critical to the practice of the current invention. High voltage electrical power supplies can be used in the same way as in conventional electrostatic spraying. The power supply should have standard safety features that prevent current or voltage surges. The electrical power supply may be built into the spray gun. Other charging methods may also be used.

More information about orifice sprays such as air spray, airless spray, and air-assisted airless spray, about heated orifice sprays, and about electrostatic spraying can be obtained from the general literature of the coating industry and from technical bulletins issued by spray equipment manufacturers, such as the following references:

1. Martens, C. R., Editor. 1974. *Technology of Paints, Varnishes and Lacquers*, Chapter 36: Application. Robert E. Yrieger Publishing Company, Huntington, N.Y.
2. Fair, James. 1983. Sprays. Pages 466–483 in Grayson, M., Editor. Kirk-Othmer Encyclopedia of Chemical Technology. Third Edition. Volume 2 1. Wiley-Interscience, New York.
3. Zinc, S. C. 1979. Coating Processes. Pages 386–426 in Grayson, M., Editor. Kirk-Othmer Encyclopedia of Chemical Technology. Third Edition. Volume 6. Wiley-Interscience, New York.
4. Long, G. E. 1978 (March 13). Spraying Theory and Practice. Chemical Engineering: 73–77.
5. Technical Bulletin. Air Spray Manual. TD 10-2R. Binks Manufacturing Company, Franklin Park, Ill.
6. Technical Bulletin. Compressed Air Spray Gun Principles. TD10-1R-4. Binks Manufacturing Company, Franklin Park, Ill.
7. Technical Bulletin. Airless Spray Manual. TD11-2R. Binks Manufacturing Company, Franklin Park, Ill.
8. Technical Bulletin. Airless Spraying. TDll-lR-2. Binks Manufacturing Company, Franklin Park, Ill.
9. Technical Bulletin. Electrostatic Spraying. TD17-lR. Binks Manufacturing Company, Franklin Park, Ill.
10. Technical Bulletin. Hot Spraying. TD42-lR-2. Binks Manufacturing Company, Franklin Park, Ill.
11. Technical bulletin on air-assisted airless spray painting system. Kremlin, Incorporated, Addison, Ill.

U.S. Pat. Nos. 3,556,411; 3,647,147; 3,754,710; 4,097,000; and 4,346,849 disclose spray nozzles and tips for use in airless spray, including designs and methods of manufacture and methods of promoting turbulence in the atomizing fluid. U.S. Pat. No. 3,659,787 discloses a spray nozzle and use of electrostatics for airless spray. U.S. Pat. Nos. 3,907,202 and 4,055,300 disclose spray nozzles and use of electrostatics for air-assisted airless spray. None of these patents uses supercritical fluids as diluents to spray coating formulations.

EXAMPLE 1

A two riter round-bottomed flask equipped with a mechanical stirrer, thermometer, Friedrichs condenser with a nitrogen inlet, and two feed adaptors was charged with 100.0 grams of pentyl propionate. The solvent was heated to 160° C. and the temperature was controlled with a Therm-O-Watch. A monomer mixture consisting of 237.0 grams of methyl methacrylate and 63.0 grams of butyl acrylate was fed via a piston pump to the flask over a four hour period. Over the same time period, a mixture of 22.0 grams of tertiary-butyl peroxybenzoate dissolved in 70.0 grams of pentyl propionate was fed to the flask via a second piston pump. After all the feeds were added, the monomer line was flushed with 15.0 grams of pentyl propionate and the reaction mixture was allowed to cook out for thirty minutes at 150° C. Then 2.0 grams of tertiary-butyl peroxybenzoate dissolved in 15.0 grams of pentyl propionate was fed to the flask and the reaction mixture was heated for an additional two hours at 150° C.

The resulting acrylic copolymer, at 59% weight solids, had a Brookfield viscosity of 405 centipoises at 25° C. Molecular weight determination by Gel Permeation Chromatography (GPC) using polystyrene as the reference gave $M_n=2125$, $M_w=3722$, and a polydispersity of 1.75.

EXAMPLE 2

The procedure used was the same as used in example 1, except the monomer mixture consisted of 237 grams of methyl methacrylate and 63 grams of butyl acrylate, and the initiator feed consisted of 11.0 grams tertiary-butyl peroxybenzoate in 70.0 grams pentyl propionate. The reaction temperature was 150° C. The post initiator consisted of 1.0 gram of tertiary-butyl peroxybenzoate in 15.0 grams of pentyl propionate. The resulting copolymer, at 57% weight solids, had a Brookfield viscosity of 1213 centipoises at 25° C. Molecular weight determination by GPC gave $M_n=3263$, $M_w=5544$, and a polydispersity of 1.70.

EXAMPLE 3

The procedure was the same as used example 2, except the reaction temperature was 140° C. The resulting copolymer, at 60% weight solids, had a Brookfield viscosity of 5055 centipoises. Molecular weight determination by GPC gave $M_n=5404$, $M_w=9419$, and a polydispersity of 1.74.

EXAMPLE 4

The procedure was the same as example 1, except the initiator mixture consisted of 5.5 grams of tertiary-butyl peroxybenzoate dissolved in 70.0 grams of pentyl propionate, and the reaction temperature was 125° C. The post initiator consisted of 0.5 grams of tertiary-butyl peroxybenzoate in 15.0 grams of pentyl propionate. The resulting copolymer, at 60% weight solids, had a Brookfield viscosity of 39,333 centipoises at 25° C. Molecular weight determination by GPC gave $M_n=9129$, $M_w=19,303$, and a polydispersity of 2.12.

EXAMPLE 5

The procedure was the same as example 1, except the monomer mixture consisted of 141.0 grams of methyl methacrylate and 159.0 grams of butyl acxylate, and the initiator consisted of 11.0 grams tertiary-butyl peroxybenzoate in 15.0 grams of pentyl propionate. The reaction temperature was 160° C., and the post initiator consisted of 1.0 gram of tertiary-butyl peroxybenzoate in 15.0 grams of pentyl propionate. The resulting acrylic copolymer, at 57% weight solids, had a Brookfield viscosity of 129 centipoises at 25° C. Molecular weight determination by GPC gave $M_n=2331$, $M_w=4339$, and a polydispersity of 1.86.

EXAMPLE 6

The procedure was the same as example 5, except the reaction temperature was kept at 135° C. The resulting copolymer, at 59% weight solids, had a Brookfield viscosity of 262 centipoises at 25° C. Molecular weight determination by GPC gave $M_n=3507$, $M_w=9603$, and a polydispersity of 2.74.

EXAMPLE 7

The procedure was the same as example 5, except the reaction temperature was kept at 125° C. The resulting copolymer, at 61% weight solids, had a Brookfield viscosity of 846 centipoises at 25° C. Molecular weight determination by GPC gave $M_n=4618$, $M_w=14,740$ and a polydispersity of 3.19.

EXAMPLE 8

The procedure was the same as example 5, except the initiator consisted of 5.5 grams of tertiary-butyl peroxybenzoate dissolved in 70.0 grams of pentyl propionate, and the reaction temperature was 120° C. The post initiator consisted of 0.5 grams of tertiary-butyl peroxybenzoate in 15.0 grams of pentyl propionate. The resulting copolymer, at 59% weight solids, had a Brookfield viscosity of 3540 centipoises at 25° C. Molecular weight determination by GPC gave $M_n=11,532$, $M_w=51,521$ and a polydispersity of 4.47.

EXAMPLE 9

The procedure was the same as example 2, except the monomer mixture consisted of 170.1 grams of methyl methacrylate, 104.4 grams of 2-ethylhexyl methacrylate, and 25.5 grams of methacrylic acid and the reaction temperature was 150° C. The resulting terpolymer, at 51% weight solids, had a Brookfield viscosity of 6530 centipoises at 25° C. Molecular weight determination by GPC gave $M_n=3164$, $M_w=7825$, and a polydispersity of 2.47.

EXAMPLE 10

The procedure was the same as example 2, except the monomer mixture consisted of 171.4 grams of methyl methacrylate, 104.4 grams of 2-ethylhexyl methacrylate, and 25.5 grams of methacrylic acid, and the reaction temperature was 130° C. The resulting terpolymer, at 55% weight solids, had a Brookfield viscosity of 70,800 centipoises at 25° C. Molecular weight determination by GPC gave $M_n=4255$, $M_w=13,079$ and a polydispersity of 3.07.

EXAMPLE 11

To a dried, round-bottomed, flask equipped with a stirrer, nitrogen purge, and condenser were charged 302.4 g of acetonitrile, 18.92 g of TMSM (methyl trimethyl silyl dimethyl ketene acetal), and 0.6 mL of catalyst (0.1M solution of tri(dimethylamino)sulfur(-trimethylsilyl)difluoride in acetonitrile). A monomer feed composed of 174.38 g (1.7417 moles) of methyl methacrylate, 107.1 g of 2-ethylhexyl methacrylate (0.5403 mole), and 48.26 g of trimethylsilyl methacrylate (0.3049 mole) was fed in the reactor at room temperature within 30 minutes, then an additional one mL of catalyst solution was added. The temperature rose from 24° C. to 30° C. After 16 hours, no exotherm was apparent, and the hydrolysis of the polymer was begun. To the polymer solution were added 44 g of a 50% (by weight) water solution of THF, and the polymer solution heated at 60° C. for two hours. The polymer was then precipitated by slowly dropping it into stirring water (15 parts water to 1 part polymer solution, by volume). The polymer was filter, and vacuum dried overnight at 83° C. The final yield of polymer was 304 g; acid level, 7.7 (theoretical, 8.53%); $M_n$, 2770 g/mole; $M_w$, 2980 g/mole.

EXAMPLE 12

The procedure was essentially the same as example 11 except that 13.98 g of TMSM was used. The yield of polymer was 304 g; acid level, 8.4% (theoretical, 8.53%); $M_n$, 4056; $M_w$, 4330.

EXAMPLE 13

The procedure was essentially the same as example 11 except that 11.12 g of TMSM was used. The yield of polymer was 301 g; acid level, 7.6% (theoretical, 8.53%); $M_n$, 4800; $M_w$, 5130.

EXAMPLE 14

The procedure was essentially the same as example 11 except that 9.32 g of TMSM was used. The yield of polymer was 306 g; acid level, 7.6% (theoretical, 8.53%); $M_n$, 6090; $M_w$, 6490.

EXAMPLE 15

The procedure was the same as example 2, except the monomer mixture consisted of 195.6 grams of methyl methacrylate and 104.4 grams of 2-ethylhexyl methacrylate. After completing the polymerization, the product was stripped of pentyl propionate by placing the mixture under high vacuum (<10 mm) and warming to 50° C. An equal weight of methyl PROPASOL acetate was then added to replace the pentyl propionate removed. The resulting copolymer, at 57% weight solids, had a Brookfield viscosity of 2100 centipoises at 25° C. Molecular weight determination by GPC gave $M_n$=3213, $M_w$=7865, and a polydispersity of 2.45.

EXAMPLE 16

The procedure was the same as example 15, except the reaction temperature was 130° C. The resulting copolymer, at 56% weight solids, had a Brookfield viscosity of 20,000 centipoises at 25° C. Molecular weight determination by GPC gave $M_n$=434 1, $M_w$=12,636, and a polydispersity of 2.91.

EXAMPLE 17

To a dried, round-bottomed, flask equipped with a stirrer, nitrogen purge, and condenser were charged 210 g of acetonitrile, 12.96 g of TMSM (methyl trimethyl silyl dimethyl ketene acetal), and 0.4 mL of catalyst (0.1M solution of tri(dimethylamino) sulfur-(trimethylsilyl) difluoride in acetonitrile). A monomer feed composed of 136.92 g (1.3676 moles) of methyl methacrylate, and 73.08 g of 2-ethylhexyl methacrylate (0.3687 mole) was fed in the reactor at room temperature within 30 minutes, then an additional 0.7 mL of catalyst solution was added. The temperature rose from 24° C. to 41° C. After 16 hours, no exotherm was apparent, and the hydrolysis of the polymer was begun. The polymer was precipitated by slowly dropping it into stirring water (15 parts water to 1 part polymer solution, by volume). The polymer was then filter, and vacuum dried overnight at 70° C. The final yield of polymer was 221 g; $M_n$ 2919 g/mole; $M_w$, 3561 g/mole.

EXAMPLE 18

The procedure was essentially the same as example 17 except that 8.46 g of TMSM was used. The yield of polymer was 218 g; $M_n$, 4244; $M_w$, 5178.

We claim:

1. A coating composition low in volatile organic solvents which comprises a monodispersed acrylic polymer solutions containing supercritical, near supercritical or subcritical fluids as a diluent therein.

2. The coating composition of claim 1 wherein the monodispersed acrylic polymer is a thermoplastic that possesses coating properties.

3. The coating composition of claim 2 wherein the monodispersed thermoplastic acrylic polymer has a molecular weight suitable for use as a coating and a $M_w/M_n$ ratio of from 1 to about 1.5.

4. The coating composition of claim 3 wherein the monodispersed thermoplastic acrylic polymer has a molecular weight suitable for use as a coating and a $M_w/M_n$ ratio of from 1.01 to about 1.4.

5. The coating composition of claim 4 wherein $M_w/M_n$ ratio is from 1.05 to about 1.03.

6. The coating composition of claim 1 wherein the polymer has either a $M_w$ or $M_n$ greater than 2,500.

7. The coating composition of claim 2 wherein the polymer has either a $M_w$ or $M_n$ greater than 2,500.

8. The coating composition of claim 3 wherein the polymer has either a $M_w$ or $M_n$ greater than 2,500.

9. The coating composition of claim 4 wherein the polymer has either a $M_w$ or $M_n$ greater than 2,500.

10. The coating composition of claim 5 wherein the polymer has either a $M_w$ or $M_n$ greater than 2,500.

11. The coating composition of claims 6 wherein the polymer has either a $M_w$ or $M_n$ greater than 3,000.

12. The coating composition of claim 7 wherein the polymer has either a $M_w$ or $M_n$ greater than 3,000.

13. The coating composition of claim 8 wherein the polymer has either a $M_w$ or $M_n$ greater than 3,000.

14. The coating composition of claim 9 wherein the polymer has either a $M_w$ or $M_n$ greater than 3,000.

15. The coating composition of claim 10 wherein the polymer has either a $M_w$ or $M_n$ greater than 3,000.

16. A coating composition comprising a supercritical fluid-low volatile organic compound containing thermoplastic acrylic polymeric coating solutions in which the polymer has either a $M_w$ or $M_n$ greater than 2,500, and a $M_w/M_n$ ratio of from 1 to about 1.5, and the thermoplastic acrylic polymer is, as such, a polymeric coating vehicle.

17. The coating composition of claim 16 wherein the thermoplastic acrylic polymer has either a $M_w$ or $M_n$ greater than 3,500, and a $M_w/M_n$ ratio of from about 1.01 to about 1.03.

18. The coating composition of claim 17 wherein the thermoplastic acrylic polymer has either a $M_w$ or $M_n$ greater than about 5,000.

* * * * *